US010730529B2

(12) United States Patent
Chase

(10) Patent No.: US 10,730,529 B2
(45) Date of Patent: Aug. 4, 2020

(54) DYNAMIC VEHICLE SEPARATION SYSTEM

(71) Applicant: Arnold Chase, West Hartford, CT (US)

(72) Inventor: Arnold Chase, West Hartford, CT (US)

( * ) Notice: Subject to any disclaimer, the term of this patent is extended or adjusted under 35 U.S.C. 154(b) by 0 days.

(21) Appl. No.: 16/416,664

(22) Filed: May 20, 2019

(65) Prior Publication Data

US 2019/0308635 A1  Oct. 10, 2019

Related U.S. Application Data

(63) Continuation of application No. 16/371,637, filed on Apr. 1, 2019.

(60) Provisional application No. 62/654,656, filed on Apr. 9, 2018.

(51) Int. Cl.
| | |
|---|---|
| *B60W 50/08* | (2020.01) |
| *B60W 50/00* | (2006.01) |
| *B60W 30/18* | (2012.01) |
| *G05D 1/08* | (2006.01) |
| *G05D 1/00* | (2006.01) |

(52) U.S. Cl.
CPC .. *B60W 50/0098* (2013.01); *B60W 30/18172* (2013.01); *B60W 50/08* (2013.01); *B60W 2420/40* (2013.01); *B60W 2530/145* (2013.01); *B60W 2530/20* (2013.01); *B60W 2554/801* (2020.02); *B60W 2555/20* (2020.02); *B60W 2710/18* (2013.01); *G05D 1/0088* (2013.01); *G05D 2201/0213* (2013.01)

(58) Field of Classification Search
CPC ............. B60W 50/0098; B60W 50/08; B60W 30/18172; B60W 2530/145; B60W 2710/18; B60W 2550/12; B60W 2550/308; B60W 2530/20; B60W 2420/40; G05D 1/0088; G05D 2201/0213
See application file for complete search history.

(56) References Cited

U.S. PATENT DOCUMENTS

| | | | |
|---|---|---|---|
| 5,099,221 A | 3/1992 | Sandkuhler | |
| 5,249,027 A | 9/1993 | Mathur et al. | |
| 6,313,742 B1 | 11/2001 | Larson | |
| 6,430,494 B1 | 8/2002 | Inoue et al. | |
| 7,117,075 B1 | 10/2006 | Larschan et al. | |
| 9,932,038 B1 | 4/2018 | Zhu et al. | |
| 10,053,095 B2 * | 8/2018 | Habu .................. | G05D 1/0257 |
| 10,347,127 B2 | 7/2019 | Droz et al. | |
| 2002/0026274 A1 | 2/2002 | Morizane et al. | |

(Continued)

FOREIGN PATENT DOCUMENTS

WO   2013114388 A1   8/2013

OTHER PUBLICATIONS

International Search Report for PCT/US2019/026473 dated Jun. 3, 2019.

*Primary Examiner* — Tyler J Lee
(74) *Attorney, Agent, or Firm* — McCormick, Paulding & Huber PLLC

(57) ABSTRACT

The Dynamic Vehicle Separation System (DVSS) according to the present application allows properly equipped vehicles in traffic to maintain safe and optimal separation distances (i.e., following distances), which are automatically and continually calculated based on numerous criteria. Vehicles are equipped with Dynamic Vehicle Separation Controllers (DVSCs) that communicate with each other to maintain proper separation distances among the vehicles.

20 Claims, 3 Drawing Sheets

(56) References Cited

U.S. PATENT DOCUMENTS

| | | |
|---|---|---|
| 2007/0038338 A1 | 2/2007 | Larschan et al. |
| 2007/0038351 A1 | 2/2007 | Larschan et al. |
| 2007/0038352 A1 | 2/2007 | Larschan et al. |
| 2007/0038353 A1 | 2/2007 | Larschan et al. |
| 2007/0050108 A1 | 3/2007 | Larschan et al. |
| 2009/0299594 A1 | 12/2009 | Harumoto et al. |
| 2010/0198477 A1 | 8/2010 | Shirai |
| 2010/0256835 A1 | 10/2010 | Mudalige |
| 2011/0153166 A1 | 6/2011 | Yester |
| 2014/0236414 A1 | 8/2014 | Droz et al. |
| 2015/0100190 A1 | 4/2015 | Yopp |
| 2015/0203107 A1 | 7/2015 | Lippman |
| 2016/0280132 A1 | 9/2016 | Palanimuthu |
| 2017/0197643 A1 | 7/2017 | Gariepy et al. |
| 2018/0210461 A1 | 7/2018 | Cremona et al. |

\* cited by examiner

DYNAMIC VEHICLE SEPARATION SYSTEM

CROSS-REFERENCE TO RELATED APPLICATION

This application is a continuation of U.S. application Ser. No. 16/371,637, filed on Apr. 1, 2019, which claims the benefit under 35 U.S.C. § 119(e) of U.S. Provisional Application No. 62/654,656, filed on Apr. 9, 2018, which is hereby incorporated by reference in its entirety.

TECHNICAL FIELD

The present invention generally relates to systems and methods for determining and dynamically maintaining optimum separation distances between vehicles, particularly, for augmenting the operation of autonomous vehicles.

BACKGROUND

At the present time, one of the most critical safety issues while driving in traffic in close proximity to other vehicles is the "separation distance" (i.e., amount of open space between two moving vehicles). Following too closely is cited as the most common reason for vehicular crashes. At its root, following too closely is caused by insufficiently judged separation distances between vehicles, which may ultimately result in a crash, significant vehicle damage, and oftentimes, physical injury to the occupants of the vehicles. There are two general considerations that are used to determine proper "separation distance": (1) reaction time of a following vehicle; and (2) the inherent stopping ability of a following vehicle relative to the stopping ability of a lead vehicle.

In a traditional non-autonomous driving environment, it is up to a vehicle's driver to continually make subjective value judgments as to an appropriate separation distance that would allow for rapid and unexpected deceleration to occur without a crash occurring. Unfortunately, the driver of a following vehicle has only a limited number of factors to consider, such as vehicular speed and obvious roadway conditions, upon which to correctly determine a proper and safe following distance. Because of the numerous physical and mechanical differences between even two vehicles of the same make and model, it is difficult for drivers to continuously judge in real time the appropriate separation distance to be maintained relative to a leading vehicle, which increases the risk of vehicular crashes.

In view of the increasing number of autonomous vehicles on roadways and the desire to ensure that such autonomous vehicles are continually operating in a safe manner to reduce the risk of accidents, there is a need for systems in vehicles to ensure that vehicles operate in a safe manner and maintain proper separation distances relative to one another. Present systems in development and operation generally rely on sensors to direct a following vehicle to maintain a predetermined fixed separation distance between itself and a leading vehicle. Such systems typically merely try to maintain a following vehicle at a set separation distance from a leading vehicle based only upon the location of the leading vehicle and a distance relative to the leading vehicle. Such existing approaches are limited in that they do not account for numerous factors that may affect the proper separation distance needed between two vehicles to avoid a crash, including but not limited to vehicular speed, roadway conditions, traffic congestion, and weather.

The present application provides systems and methods for determining and maintaining proper separation distances between traveling vehicles, which overcome the drawbacks and limitations of current systems and methods.

SUMMARY

Provided is a Dynamic Vehicle Separation System (DVSS) for automatically deriving, and continually broadcasting to following vehicles, a separation factor value derived from various physical and performance parameters unique to each type of vehicle and each individual vehicle, which when considered, represents the overall stopping ability of a vehicle at any given moment by dynamically factoring multiple relevant criteria of the vehicle (e.g., separation factor modification values), as adjusted by present ambient conditions, into the derivation. The DVSS may also automatically control the operation of a vehicle for automatically and continually maintaining a safe and optimum following distance by comparing the differential between the separation factor value of a leading vehicle against the separation factor value of a following vehicle, and dynamically adjusting the spacing between the vehicles accordingly to ensure that a following vehicle will never hit a followed vehicle under any braking circumstance.

In one embodiment of the present application, a Dynamic Vehicle Separation Controller (DVSC) is configured to be installed in a vehicle. The DVSC comprises a processor, a memory connected to the processor, and an input/output interface connected to the processor. The memory stores a calculated stopping distance numeric value for the vehicle, whose value represents the distance required for the vehicle to reach a complete stop from a specified speed. The input/output interface receives signals corresponding to the real-time speed of the vehicle, and the processor calculates an adjusted separation factor value based on the real-time speed of the vehicle and the stopping distance numeric value for the vehicle. The adjusted separation factor value factored for a given speed, as dynamically adjusted, indicates the distance required for the vehicle to reach a complete stop from the real-time speed, based on a combination of the stopping distance numeric value in memory as modified by the real-time speed factor. Additionally, the processor may include various separation factor modification values in its calculation of the vehicle's adjusted separation factor value.

In some embodiments of the DVSC, the memory stores the vehicle mileage when the tires were installed on the vehicle, the input/output interface receives a signal corresponding to the present mileage of the vehicle, and the processor calculates a separation factor modification value based on pro-rating the tire tread wear expectancy for that type of tire against the mileage the tires have covered since the tires were installed on the vehicle to determine the tire's remaining tread depth, and its corresponding influence on braking effectiveness diminishment.

In some embodiments of the DVSC, the memory stores the type of tire installed on the vehicle (e.g., all-weather, snow, high-performance, etc.) and its corresponding wet and dry braking distance ability, the input/output interface receives a signal corresponding to the ambient temperature at that moment, and the processor calculates a separation factor modification value based on the effect on braking distance for that type of tire at the calculated tread depth in the context of the present ambient temperature.

In some embodiments of the DVSC, the memory stores the type of tire installed on the vehicle, the input/output interface receives a signal corresponding to the instant precipitation condition, and the processor calculates a separation factor modification value based on that type of tire's stopping ability for the calculated tread wear under the instant precipitation condition.

In some embodiments of the DVSC, the input/output interface receives a signal corresponding to real-time tire air pressures and the processor calculates a separation factor modification value based on the deviation of the real-time tire air pressures from their recommended target values.

In some embodiments of the DVSC, the input/output interface simultaneously receives signals corresponding to a real-time outside air temperature and real-time precipitation events and the processor calculates a separation factor modification value based on whether the precipitation is frozen or not.

In some embodiments of the DVSC, the input/output interface receives a signal indicating activation of the vehicle's anti-skid system and the processor calculates a separation factor modification value based on the activation of the vehicle's anti-skid system.

In some embodiments of the DVSC, the input/output interface receives an outside signal indicating a hazardous or other road condition by the local authorities, which includes a separation factor modification value, and the processor includes this modification value in its calculation of the vehicle's separation factor value.

In one embodiment of the present application, a Dynamic Vehicle Separation System (DVSS) comprises a first Dynamic Vehicle Separation Controller (DVSC) installed on a first ("followed") vehicle and a second Dynamic Vehicle Separation Controller (DVSC) installed on a second ("following") vehicle, where the second vehicle travels directly behind the first vehicle. The first DVSC transmits a signal indicating its separation factor value, which indicates the distance required for the first vehicle to reach a complete stop from the instant real-time speed. The second DVSC calculates its own separation factor value, which indicates the distance required for the second vehicle to reach a complete stop from the instant real-time speed. The second DVSC compares the separation factor value received from the first vehicle and compares it to its own separation factor value at that moment. If the separation factor values of the two vehicles are identical, then the second DVSC assigns the following vehicle a calculated following separation distance command. If the separation factor value of the first vehicle is lower than that of the second vehicle, which would indicate to the second DVSC that the first vehicle would take longer to slow down, then the second DVSC would assign the following vehicle a decreased following separation distance command that takes into account the ability of the second vehicle to stop more quickly. Similarly, If the separation factor value of the first vehicle is higher than the second vehicle, which would indicate to the second DVSC that the first vehicle would take less time to slow down, then the second DVSC would assign the following vehicle an increased following separation distance command that takes into account the ability of the first vehicle to stop more quickly.

In some embodiments of the DVSS, each vehicle equipped with DVSS equipment would be equipped with a highly directional Infra-Red (IR) data transmitter that would be located in the center-rear area of the vehicle, which would continually transmit the adjusted separation factor value of said vehicle to a following vehicle. Through optics, shields, etc., the IR data would only be able to be received by a following vehicle located directly behind the followed vehicle. Each vehicle equipped with DVSS equipment would also be equipped with a highly directional Infra-Red (IR) data receiver that would be located in the center-front area of the vehicle, which would continually receive the adjusted separation factor value of a followed vehicle.

In some embodiments of the DVSS, each vehicle equipped with DVSS equipment would be equipped with a unidirectional antenna or IR receiver to receive data from outside parties such as roadway authorities which would be able to transmit to all vehicles in the general vicinity an additional separation factor modification value for use by the DVSC in each vehicle so equipped.

In some embodiments of the DVSS, when the real-time distance between the first vehicle and the second vehicle is less than the calculated separation distance, the second DVSC sends a signal for the second vehicle to increase the real-time distance between the first vehicle and the second vehicle.

In some embodiments of the DVSS, the second DVSC sends a signal for the second vehicle to reduce its speed to increase the real-time distance between the first vehicle and the second vehicle.

In some embodiments of the DVSS, when the real-time distance between the first vehicle and the second vehicle is greater than the calculated separation distance, the second DVSC sends a signal for the second vehicle to reduce the real-time distance between the first vehicle and the second vehicle.

In some embodiments of the DVSS, the second DVSC sends a signal for the second vehicle to increase its speed to reduce the real-time distance between the first vehicle and the second vehicle.

In some embodiments of the DVSS, the first DVSC comprises a processor, a memory connected to the processor, and an input/output interface connected to the processor. The memory stores a stopping distance numeric value for the first vehicle, which indicates the distance required for the first vehicle to reach a complete stop from a specified speed. The input/output interface receives a signal corresponding to the real-time speed of the first vehicle, and the processor calculates the first separation factor value based on the real-time speed of the first vehicle and the stopping distance numeric value for the first vehicle. The first separation factor value factored for a given speed, as dynamically adjusted, indicates the distance required for the first vehicle to reach a complete stop from the real-time speed, based on a combination of the stopping distance numeric value stored in memory as modified by the real-time speed factor. Additionally, the processor may include various separation factor modification values in its calculation of the first vehicle's adjusted separation factor value.

In some embodiments of the first DVSC, the memory stores the type of tires installed on the first vehicle, as well as the vehicle mileage when the tires were installed on the first vehicle, the input/output interface receives a signal corresponding to a real-time mileage of the first vehicle, and the processor calculates an adjusted separation factor value based on the type of tire and the vehicle mileage between the mileage when the tires were installed on the first vehicle and the real-time accumulated mileage of said tires on the first vehicle.

In some embodiments of the first DVSC, the input/output interface receives a signal corresponding to the real-time tire air pressures of the first vehicle and the processor calculates a separation factor modification value based on the deviation of the real-time tire air pressures from their recommended target values.

In some embodiments of the first DVSC, the input/output interface receives a signal corresponding to a real-time outside air temperature and the processor calculates a separation factor modification value based on whether the real-time outside air temperature indicating freezing or abnormally hot roadway conditions.

In some embodiments of the first DVSC, the input/output interface receives a signal indicating precipitation and the processor calculates a separation factor modification value based on the indication of precipitation.

In some embodiments of the first DVSC, the input/output interface receives signals indicating precipitation and real-time outside air temperature and the processor calculates a separation factor modification value based on the indication of whether the precipitation is likely to be frozen or not.

In some embodiments of the first DVSC, the input/output interface receives a signal indicating activation of the first vehicle's anti-skid system and the processor calculates a separation factor modification value based on the activation of the first vehicle's anti-skid system.

In some embodiments of the first DVSC, the input/output interface receives an outside signal indicating a hazardous or other road condition and the processor calculates a separation factor modification value based on the indication and type of the hazardous road condition.

In some embodiments of the first DVSC, the input/output interface receives a signal indicating an unusual physical condition of a load on the first vehicle or a signal indicating a minimum separation requirement for the first vehicle, which requires an increase to the separation distance between the first vehicle and the second vehicle; and the processor calculates the first separation factor value also based on the indication of the unusual physical condition of the load on the first vehicle or on the indication of the minimum separation requirement of the first vehicle.

In some embodiments of the DVSS, the second DVSC comprises a processor, a memory connected to the processor and an input/output interface connected to the processor. The memory stores a stopping distance numeric value for the second vehicle, which indicates the distance required for the second vehicle to reach a complete stop from a specified speed. The input/output interface receives a signal corresponding to a real-time speed of the second vehicle, and the processor calculates the second separation factor value based on the real-time speed of the second vehicle and the stopping distance numeric value for the second vehicle. The second separation factor value factored for a given speed, as dynamically adjusted, indicates the distance required for the second vehicle to reach a complete stop from the real-time speed, based on a combination of the stopping distance numeric value in memory as modified by the real-time speed factor. Additionally, the processor may include various separation factor modification values in its calculation of the second vehicle's adjusted separation factor value.

In some embodiments of the second DVSC, the memory stores the type of tires installed on the second vehicle and the vehicle mileage when the tires were installed on the second vehicle, the input/output interface receives a signal corresponding to a real-time mileage of the second vehicle, and the processor calculates a separation factor modification value by pro-rating the tire tread wear expectancy for that type of tire against the mileage the tires have covered since the tires were installed on the vehicle to determine the tire's remaining tread depth, and its corresponding influence on braking effectiveness diminishment.

In some embodiments of the second DVSC, the input/output interface receives signals indicating precipitation and real-time outside air temperature and the processor calculates a separation factor modification value based on the determination of whether the precipitation is likely to be frozen or not.

In some embodiments of the second DVSC, the input/output interface receives a signal corresponding to the real-time tire air pressures of the second vehicle and the processor calculates a separation factor modification value based on the deviation of the real-time tire air pressures from their recommended target values.

In some embodiments of the second DVSC, the input/output interface receives a signal corresponding to a real-time outside air temperature and the processor calculates a separation factor modification value based on whether the real-time outside air temperature indicates freezing or abnormally hot roadway conditions.

In some embodiments of the second DVSC, the input/output interface receives a signal indicating precipitation and the processor calculates the second separation factor modification value based on the indication of precipitation.

In some embodiments of the second DVSC, the input/output interface receives a signal indicating activation of the second vehicle's anti-skid system and the processor calculates the second separation factor modification value based on the activation of the second vehicle's anti-skid system.

In some embodiments of the second DVSC, the input/output interface receives an outside signal indicating a hazardous or other road condition, and the processor recalculates and modifies the separation factor value based on the indication of the hazardous road condition.

In some embodiments of the second DVSC, the input/output interface receives a signal indicating an unusual physical condition of a load on the first vehicle or a signal indicating a minimum separation requirement for the first vehicle, which requires an increase to the separation distance between the first vehicle and the second vehicle; and the processor calculates the separation distance between the first vehicle and the second vehicle also based on the indication of the unusual physical condition of the load on the first vehicle or on the indication of the minimum separation requirement of the first vehicle.

In one embodiment of the present application, provided is a method of calculating and maintaining a separation distance between a first vehicle and a second vehicle. A second Dynamic Vehicle Separation Controller (DVSC) installed on the second vehicle receives a first separation factor value signal from a first Dynamic Vehicle Separation Controller (DVSC) installed on the first vehicle, which indicates the distance required for the first vehicle to reach a complete stop from a first real-time speed. The second DVSC calculates a second separation factor value indicating the distance required for the second vehicle to reach a complete stop from a second real-time speed. The second DVSC transmits a second separation factor value signal indicating the distance required for the second vehicle to reach a complete stop from the second real-time speed.

In some embodiments of the method, the second DVSC calculates a separation distance needed between the first vehicle and the second vehicle based on the first separation factor value relative to the second separation factor value.

In some embodiments of the method, the second DVSC receives a distance signal indicating a real-time distance between the first vehicle and the second vehicle from systems already in the second vehicle such as, e.g., radar, LIDAR, etc., which appear on the CAN Bus.

In some embodiments of the method, the second DVSC commands the second vehicle to increase the real-time distance between the first vehicle and the second vehicle when the real-time distance between the first vehicle and the second vehicle is less than the calculated separation distance.

In some embodiments of the method, the second DVSC commands the second vehicle to reduce its speed to increase the real-time distance between the first vehicle and the second vehicle.

In some embodiments of the method, the second DVSC commands the second vehicle to reduce the real-time distance between the first vehicle and the second vehicle when the real-time distance between the first vehicle and the second vehicle is greater than the calculated separation distance.

In some embodiments of the method, the second DVSC commands the second vehicle to increase its speed to reduce the real-time distance between the first vehicle and the second vehicle.

In some embodiments of the method, the second DVSC comprises a processor, a memory connected to the processor, and an input/output interface connected to the processor. A stopping distance numeric value for the second vehicle is stored in the memory, where the stopping distance numeric value represents the distance required for the second vehicle to reach a complete stop from a specified speed. The input/output interface receives a signal corresponding to a real-time speed of the second vehicle and the processor calculates the second separation factor value based on the real-time speed of the second vehicle and the stopping distance numeric value for the second vehicle. The second separation factor value factored for a given speed, as dynamically adjusted, indicates the distance required for the second vehicle to reach a complete stop from the real-time speed, based on a combination of the stopping distance numeric value in memory as modified by the real-time speed factor. Additionally, the processor may include various separation factor modification values in its calculation of the second vehicle's adjusted separation factor value.

In some embodiments of the method, the type of tire installed on the second vehicle and the vehicle mileage when the tires were installed on the second vehicle is stored in the memory. The input/output interface receives a signal corresponding to a real-time mileage of the second vehicle and the processor calculates the second separation factor modification value based on the type of tire and the tire wear mileage since the tires were installed on the second vehicle.

In some embodiments of the method, the input/output interface receives a signal corresponding to real-time tire air pressures of the second vehicle and the processor calculates a separation factor modification value based on the variance from the recommended real-time tire air pressures of the second vehicle.

In some embodiments of the method, the input/output interface receives a signal corresponding to a real-time outside air temperature and the processor calculates a separation factor modification value based on the based on the real-time outside air temperature indicating freezing or abnormally hot roadway conditions.

In some embodiments of the method, the input/output interface receives a signal indicating precipitation and the processor calculates a separation factor modification value based on the indication of precipitation.

In some embodiments of the method, the input/output interface receives a signal indicating activation of the second vehicle's anti-skid system and the processor calculates a separation factor modification value based on the activation of the second vehicle's anti-skid system.

In some embodiments of the method, the input/output interface receives a signal from an external source indicating a hazardous road condition and the processor calculates a separation factor modification value based on the type of the hazardous road condition signal.

In some embodiments of the method, the second DVSC receives a signal indicating an unusual physical condition of a load on the first vehicle or a signal indicating a minimum separation requirement for the first vehicle, which requires an increase to the separation distance between the first vehicle and the second vehicle; and the first DVSC calculates the separation distance between the first vehicle and the second vehicle also based on the indication of the unusual physical condition of the load on the first vehicle or on the indication of the minimum separation requirement of the first vehicle.

BRIEF DESCRIPTION OF THE DRAWINGS

The foregoing summary, as well as the following detailed description, is better understood when read in conjunction with the appended drawings. For the purpose of illustrating the invention, exemplary embodiments are shown in the drawings, it being understood, however, that the present application is not limited to the specific embodiments disclosed. In the drawings.

DETAILED DESCRIPTION

Figure 1:
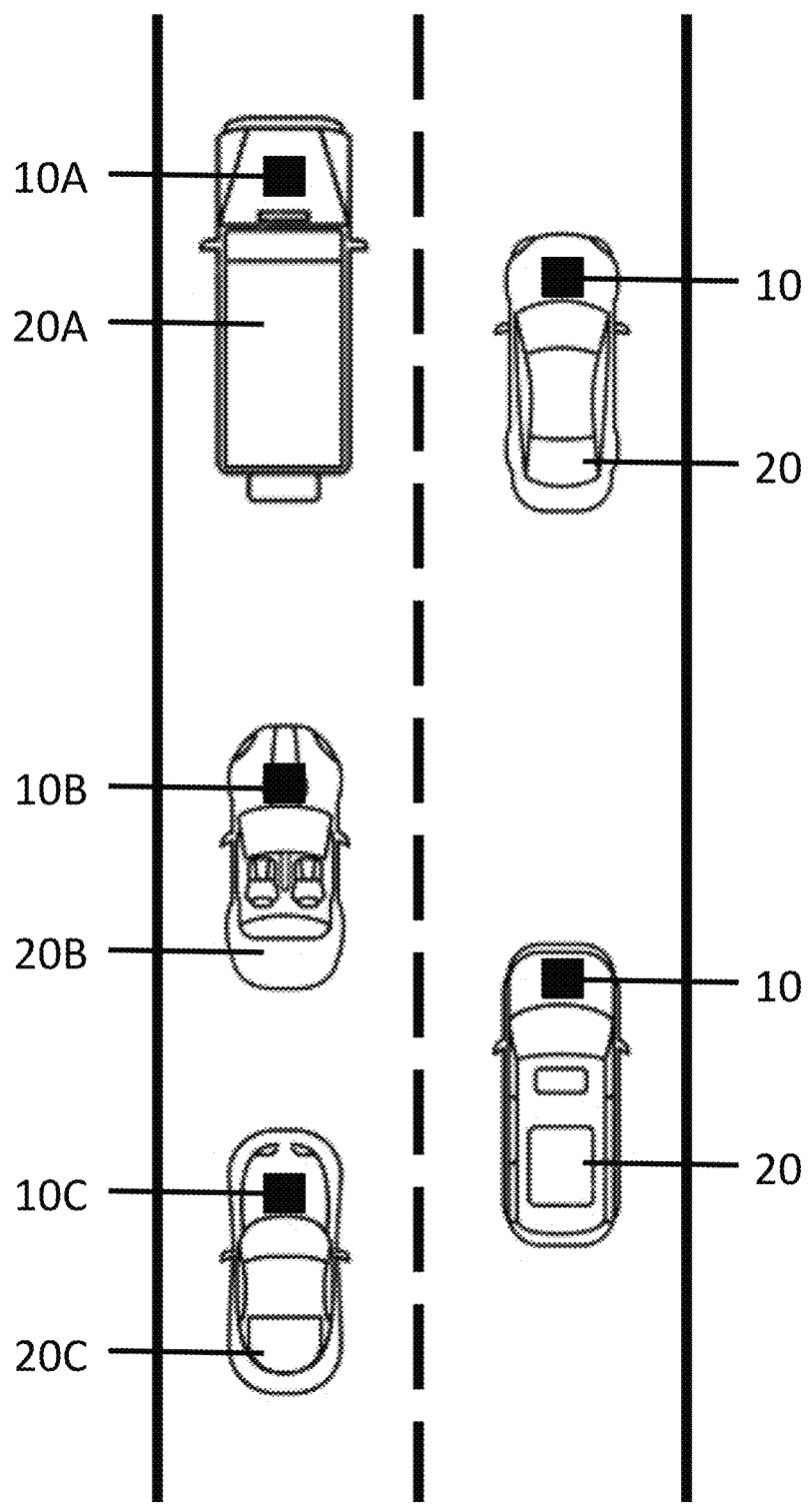
FIG. 1 shows a schematic diagram of an exemplary Dynamic Vehicle Separation System (DVSS)

The Dynamic Vehicle Separation System (DVSS) according to the present application allows properly equipped vehicles in traffic to maintain safe and optimal separation distances (i.e., following distances), which are automatically and continually calculated based on numerous criteria. Vehicles are equipped with Dynamic Vehicle Separation Controllers (DVSCs) that communicate with each other to maintain proper separation distances among the vehicles. Unlike Adaptive Cruise Control systems, for instance, the DVSCs of the DVSS continuously and intelligently take into account various factors (e.g., physical and operational characteristics of vehicles, road conditions, etc.) to calculate and maintain proper separation distances, rather than merely maintaining an overall pre-determined separation distance for all vehicles, regardless of various factors that may affect the separation distances at which vehicles may safely travel among each other.

To date, only individual or small groupings of carefully controlled test autonomous vehicles have taken to public roadways. In most cases, these groups of test autonomous vehicles are identical to one another, and as such, their operating characteristics are known and uniform. This means that, theoretically, two or more such test autonomous vehicles, regardless of speed or deceleration rates (if properly speed biased) would never be able to crash into one another. As autonomous vehicles are more widely adopted and accepted on roadways, there will be a greater mix of autonomous vehicles (e.g., passenger, commercial and freight autonomous vehicles of different models and sizes within different categories) on roadways in close proximity to one another as exists today with operator-driven vehicles.

One of the significant features of autonomous vehicle operation is the inherent ability of autonomous vehicles to communicate with other nearby autonomous vehicles, continuously conveying vehicle information and situational awareness information amongst themselves. Such communications can provide information about vehicle speed, road conditions, traffic conditions, delays, and the like, which can be used to improve safe operation of all vehicles on the road. The present DVSS leverages the inherent ability of autonomous vehicles to communicate various types of information to dynamically, optimally, and automatically coordinate autonomous vehicles to maintain proper separation distances in traffic comprising a mixed group of autonomous vehicles.

While the DVSS is applicable to the safe and automatic operation of autonomous vehicles, it may also be used with operator-driven vehicles as a safety back-up, particularly during the transition from driven vehicles to autonomous vehicles. As autonomous vehicles replace operator-driven vehicles, autonomous vehicles will share the roadways with operator-driven vehicles. Because the operation of operator-driven vehicles is based on an operator's judgment and the operation of autonomous vehicles is based on rules-based logic, mixed traffic scenarios including both autonomous vehicles and operator-driven vehicles have shown a greater potential for collisions and accidents. For example, when an operator-driven vehicle is following an autonomous vehicle, there is a greater risk of the operator-driven vehicle "rear-ending" the autonomous vehicle because the autonomous vehicle will have a faster braking reaction time than the operator-driven vehicle. Due to the difference in initial braking reactive times between driven and autonomous vehicles and, as such, need a longer initial braking reaction time adjustment to the separation value calculation, driven vehicles need to transmit to autonomous vehicles the fact that they are driven. Conversely, due to the difference in initial braking reactive times between driven and autonomous vehicles and, as such, need a shorter initial braking reaction time adjustment to the separation value calculation, autonomous vehicles need to transmit to driven vehicles the fact that they are autonomous. Thus, there is a need for additional control mechanisms for operator-driven vehicles to coordinate with autonomous vehicles to safely maximize travel speeds and traffic density on roadways. There will come a "tipping point" time wherein the number of autonomous vehicles will grow and the number of driven vehicles will number in the minority and, at that point, systems, such as DVSS, will need to be made mandatory for the safety of driven vehicles and autonomous vehicles alike.

The present DVSS may be particularly useful in mixed traffic including both autonomous vehicles and operator-driven vehicles. By equipping operator-driven vehicles (i.e., non-autonomous vehicles) with DVSS equipment, properly equipped operator-driven vehicles may be able to more safely operate in roadways shared with autonomous vehicles by tailoring their braking and/or reaction time characteristics to be more compatible with adjacent autonomous vehicles. For example, DVSS equipment may be implemented in operator-driven vehicles to provide drivers with aural and/or visual indications of insufficient separation distances, or can be configured to be directly integrated into Adaptive Cruise Control systems or automatic braking systems as an override to maintain proper separation distances. Thus, the implementation of DVSS in mixed traffic scenarios may be particularly advantageous to maintain proper separation distances among autonomous vehicles and operator-driven vehicles.

In the future world of autonomous vehicles, particular attention needs to be given to the fact that, as with today's vehicular mix, there will continue to be a wide and varied mix of vehicle types and sizes, each with different individual performance and braking characteristics. Beyond the basic vehicular class, e.g., passenger vehicle, truck, etc., there are also sub-classes of vehicles such as fire trucks that have specific additional separation requirements such as (e.g., "keep back 100 feet", etc.), trucks or passenger vehicles carrying loads which extend beyond the rear edges of a vehicle (e.g., pipes, boards, etc.) where visual markers such as red flags/fabric are used with driven vehicles but are invisible/outside the normal sensing locations of autonomous vehicles. Just as human drivers take additional steps today to make following vehicles aware of such unusual conditions, the DVSS may include a manual provision to modify the separation factor value to increase the separation distance based on such unusual conditions. The present DVSS is designed to allow optimal and safe roadway utilization by either a closely spaced mix of autonomous vehicles, or a mix of autonomous and non-autonomous vehicles, regardless of whether there are widely differing braking characteristics between vehicles. Vehicles equipped with DVSS equipment, whether autonomous or non-autonomous, will allow a leading vehicle to dynamically send a following vehicle relevant data so that the following vehicle can dynamically calculate an optimal separation distance to prevent the following vehicle from crashing into the leading vehicle, regardless of speed, weather conditions, etc.

Figure 2:
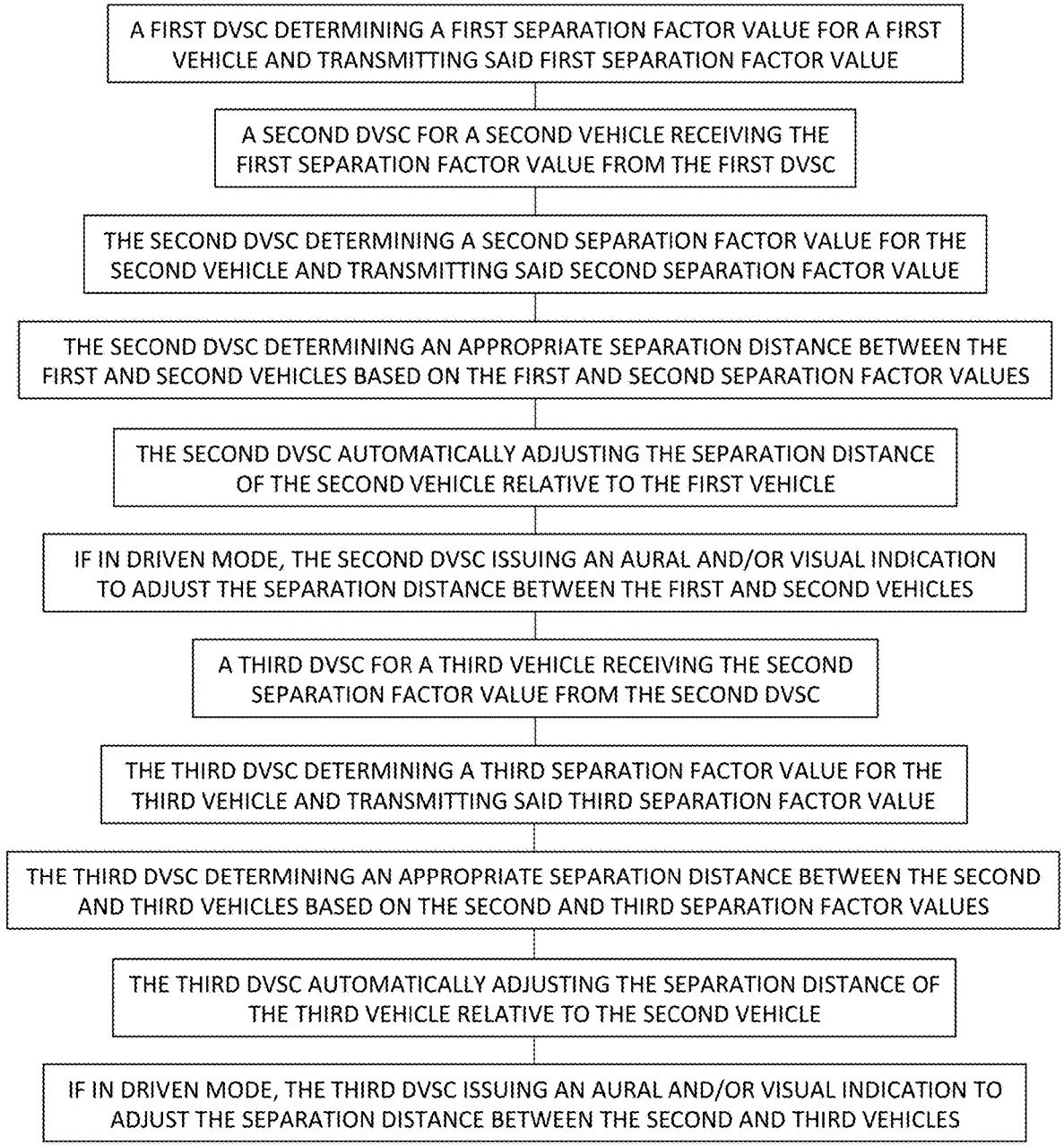
FIG. 2 shows an exemplary flow diagram for the operation of the exemplary DVSS of FIG. 1.

FIGS. 1 and 2 show an exemplary DVSS 1 and method of operation including a plurality of vehicles (both autonomous and non-autonomous) equipped with Dynamic Vehicle Separation Controllers 10 (DVSCs). Vehicles equipped with DVSC 10 communicate with one another to transmit relevant information for determining proper separation distances among vehicles to prevent accidents and/or collisions. For example, each DVSC 10 continually transmits its corresponding vehicle's separation factor value, which indicates the vehicles ability to reach a complete stop given real-time operating conditions. The separation factor value is calculated by DVSC 10 based on the vehicle's braking rating (stopping distance numeric value) adjusted for real-time operating factors (separation factor modification/correction values). The braking rating refers to the braking distance for the vehicle make and model to reach a complete stop from a specified speed. The braking rating (e.g., braking distance) may be standardized for all vehicle makes and models at their corresponding maximum gross vehicle weight rating and at a standardized speed (e.g., 60 mph to 0 mph). At a minimum, for example, the separation factor value indicates the vehicle's real-time ability to reach a complete stop (e.g., real-time braking distance) based at least on the vehicle's braking rating and the vehicle's real time speed. The separation factor value may be modified by the processor to further reflect the vehicle's stopping ability based on other operating conditions, such as, e.g., tire type, tire wear, weather conditions, etc.

Between a leading vehicle 20A and a first trailing vehicle 20B, the DVSC 10A of the leading vehicle 20A transmits the separation factor value of the leading vehicle 20A to the DVSC 10B of the first trailing vehicle 20B. Based on the separation factor value of the leading vehicle 20A and the separation factor value of the first trailing vehicle 20B, the DVSC 10B of the first trailing vehicle 20B calculates an appropriate separation distance between the leading vehicle 20A and the first trailing vehicle 20B for avoiding a crash and/or collision, which takes into account factors such as, for example, the characteristics of the vehicles (e.g., braking rating, etc.) and the real-time operating conditions (e.g., speed, weather conditions, traffic conditions, etc.). The DVSC 10B of the first trailing vehicle 20B then resolves the calculated appropriate separation factor values of 10A and 10B into a real-time separation distance between leading vehicle 20A and first trailing vehicle 20B to automatically adjust the separation distance between leading vehicle 20A and first trailing vehicle 20B (e.g., accelerate or decelerate the first trailing vehicle 20B) or issue an aural and/or visual indication to adjust the separation distance of first trailing vehicle 20B relative to the leading vehicle 20A (e.g., accelerate or decelerate the first trailing vehicle 20B).

In a similar fashion, first trailing vehicle 20B would also transmit its own separation factor value to a second trailing vehicle 20C directly following first trailing vehicle 20B, and so on. If all of the vehicles in a long series of vehicles were equipped with a DVSC 10, each and every vehicle would automatically be correctly spaced between itself and the vehicle in front of it, so that even if the first vehicle in the series were to suddenly apply full braking effort, regardless of operating conditions (such as, e.g., vehicular speed(s), vehicle types, vehicle weights, operating condition of any vehicle, or braking ability of any vehicle), the entire column of vehicles would simultaneously safely stop without any vehicle hitting the vehicle in front of it. Because DVSC 10 individually sets each corresponding vehicle's separation distance (i.e., following distance) in a grouping of vehicles to the optimal value for safe operation, the density of a column is inherently optimized allowing vehicles on a roadway to operate at maximum speed, traffic density, and capacity.

Figure 3:
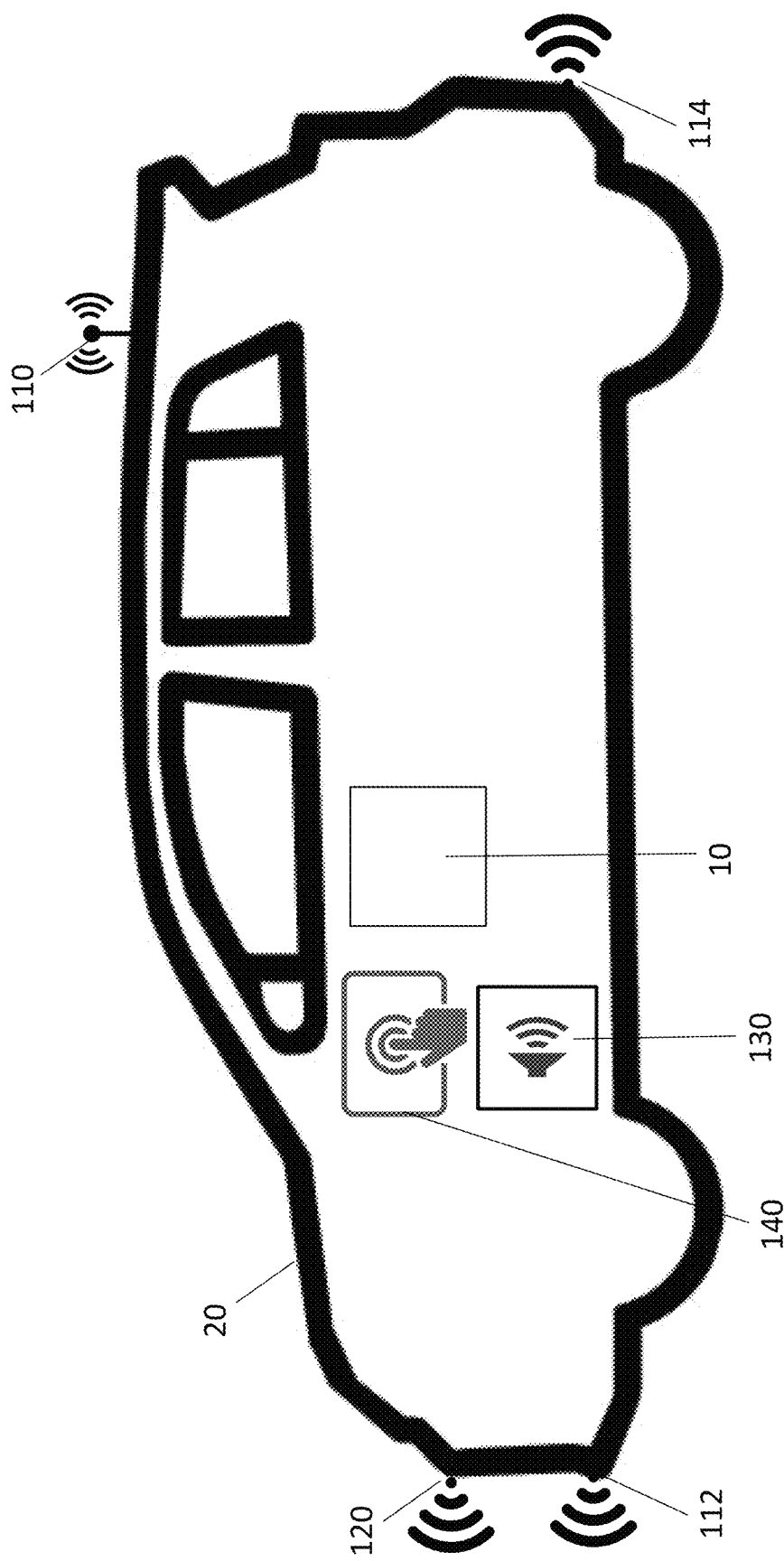
FIG. 3 shows a schematic diagram of an exemplary Dynamic Vehicle Separation Controller (DVSC) of the exemplary DVSS of FIG. 1.

As shown in FIG. 3, DVSC 10 may be a standalone unit configured to be connected to be operably connected to the driving system (e.g., CAN bus) of an autonomous vehicle or the driving system (e.g., CAN bus) of a non-autonomous vehicle. DVSC 10 provides General Purpose Input/Output (GPIO) functions for retrieving data from the vehicle, receiving data from other vehicles, transmitting data to other vehicles, receiving data from the roadway authorities, automatically adjusting the separation distance between the vehicle and another vehicle (e.g., accelerate or decelerate the vehicle) and/or issue an aural and/or visual indication to adjust the separation distance between the vehicle and another vehicle (e.g., accelerate or decelerate the trailing vehicle).

The functions of DVSC 10 described herein may be implemented using computer applications comprising computer program code stored in a computer-readable medium that is executed by a computer processor. The functions of DVSC 10 described herein may also be implemented in programmable hardware devices such as field programmable gate arrays, programmable array logic, programmable logic devices or the like. Further, functions of DVSC 10 described herein may be implemented using some combination of computer program(s) executed by a computer processor and programmable hardware devices. Thus, DVSC 10 of the present application comprise suitable computer hardware and software for performing the desired functions and are not limited to any specific combination of hardware and software. In one embodiment, DVSC 10 comprises a processor 12, a memory 14 connected to the processor 12, and an input/output interface 16 connected to the processor 12.

DVSC 10 may include a "third party" signal receiver 110 (such as used for I2V), a data signal receiver 112 to receive data from other vehicles (e.g., a separation factor value from another vehicle), and a data signal emitter 114 to transmit data to a following vehicle (e.g., a separation factor value corresponding to the vehicle on which DVSC 10 is installed). For example, data signal receiver 112 may be a highly directional and optionally shielded Infra-Red (IR) data receiver located ideally in the front-center area of the vehicle for the reception of a separation factor value from a followed vehicle, and data signal emitter 114 may be a highly directional and optionally shielded Infra-Red (IR) data transmitter located ideally in the rear-center area of the vehicle for the transmission of a separation factor value to a following vehicle. Alternatively, DVSC 10 may be connected to a signal transceiver (or separate signal receiver and signal emitter) already installed on the vehicle to communicate data with other vehicles. DVSC 10 may also include one or more sensors 120 for determining certain conditions (e.g., the separation distance between the vehicle and another vehicle). Alternatively, DVSC 10 may be connected to sensors already installed on the vehicle to determine the real-time separation distance between the vehicle and another vehicle. DVSC 10 may further include a sound system 130 and/or a display system 140 to provide an aural and/or visual indication to adjust the separation distance between the vehicle and another vehicle (e.g., accelerate or decelerate the trailing vehicle). Alternatively, DVSC 10 may be connected to a sound system and/or a display system already installed on the vehicle to provide an aural and/or visual indication to adjust the separation distance between the vehicle and another vehicle.

As shown in FIGS. 2 and 3, in operation, DVSC 10 installed in a vehicle 20 calculates the vehicle's 20 separation factor value (i.e., vehicle's real-time ability to reach a complete stop) based on at least, for example, the vehicle's braking rating and the vehicle's real time speed. The braking rating refers to the braking distance for the vehicle make and model to reach a complete stop from a specified speed. The braking rating (e.g., braking distance) may be standardized for all vehicle makes and models at their corresponding maximum gross vehicle weight rating and at a standardized speed (e.g., 60 mph to 0 mph). The braking rating for the vehicle may be stored in the memory 14 of DVSC 10. Input/output interface 16 of DVSC 10 may be operably connected to the driving system (e.g., CAN bus) of vehicle 20 to receive data corresponding to the real-time speed of vehicle 20. Based on the real-time speed and the braking rating for the vehicle 20, processor 12 of DVSC 10 may calculate a separation factor value for vehicle 20. The separation factor value indicates the distance required for the vehicle 20 to reach a complete stop from the real-time speed (e.g., real-time braking distance).

DVSC 10 may also calculate the vehicle's 20 separation factor value (i.e., vehicle's real-time ability to reach a complete stop) by accounting for weather condition factors, such as, e.g., measurements of temperature and road conditions. DVSC 10 may receive temperature data from the vehicle's temperature sensors via a connection to the vehicle's CAN bus. Also, DVSC 10 may deduce road condition based on signals received via a connection to the vehicle's CAN bus. For example, a signal indicating that the vehicle's windshield wipers are on would be indicative of precipitation. Alternatively, a signal from the vehicle's windshield moisture sensors would indicate whether there was precipitation. Additionally, for example, if the IR data signal level received from the IR emitter of a followed vehicle falls below a preset received signal level, it can be used by the DVSC of the following vehicle to automatically increase the following distance as a safety measure due to presumed fog/heavy rain/snow interference.

DVSC 10 may further calculate the vehicle's 20 separation factor value (i.e., vehicle's real-time ability to reach a complete stop) by accounting for vehicle tire condition factors, such as, e.g., tread wear, tire air pressure, type of tire, etc. Tread wear and/or incorrect tire pressures diminishes a vehicle's stopping ability (i.e., increases a vehicle's braking distances). Just as vehicles can dynamically calculate the interval between oil changes based on historic speeds and type of driving, tire tread wear can similarly be determined based on mileage driven since the installation of the tires. The mileage at which new tires are installed on the vehicle may be stored in memory 14 and compared by DVSC 10 to the real-time mileage of the vehicle (received via connection to the driving system, e.g., CAN bus) to determine tire tread wear. Also, improperly inflated tires diminish a vehicle's stopping ability (i.e., increases a vehicle's braking distance). DVSC 10 may receive tire pressure data from the vehicle's tire pressure sensors via a connection to the vehicle's CAN bus. Further, the type of tires installed on a vehicle (e.g., snow tires, all-weather tires, etc.) and the temperature that they are operating in will affect the vehicle's stopping ability. An example of this would be the DVSC 10 recognizing that a subject vehicle was equipped with snow tires, and the ambient temperature was well above freezing, while the vehicles windshield wipers were on (which would indicate rain). Since the braking ability of snow tires is diminished on wet surfaces relative to all-weather tires, the DVSC 10 would modify the separation factor value to increase the following distances by an appropriate modification value.

DVSC 10 may further calculate the vehicle's 20 separation factor value (i.e., vehicle's real-time ability to reach a complete stop) by accounting for external condition factors, such as, e.g., activation of a leading or following vehicle's anti-skid system (i.e., wheel slip), warning signals indicating heavy traffic ahead, an oil slick, foreign objects on the roadway, an accident, etc. Signals indicating activation of a leading vehicle's 20A anti-skid system may be transmitted by the leading vehicle's 20A DVSC 10A and received by a trailing vehicle's 20B DVSC 10B. As a result, the trailing vehicle's 20B DVSC 10B may increase the separation distance between the leading vehicle 20A and the trailing vehicle 20B for a set amount of time. DVSC 10 may be configured to receive external compensation value skews to further modify/increase the calculated separation distances between vehicles. An example of this would be an "overriding" skew value sent by local or highway authorities in reaction to special concerns such as heavy traffic ahead, an oil slick, foreign objects on the roadway, an accident, etc. The non-autonomous analog to this is when highway authorities display special temporary lower speed limits in response to weather or local roadway conditions. Some of this information can be provided by the network of DVSC's 10 in vehicles along the roadway in advance of any vehicle.

In accordance with the present invention, DVSC 10 may be configured to dynamically calculate separation distances by accounting for these factors, as well as other factors, such as, e.g., the traveling speeds of surrounding vehicles, the type, size, and weight of surrounding vehicles, and the type and design of a roadway (e.g., one-lane road or multi-lane highway). In this regard, optionally the lead vehicle in an ad-hoc grouping or column of vehicles would transmit a code in its data stream to proximal following vehicles to indicate its front-running positional status. Each following vehicle would incrementally set its "positional" codes accordingly. As vehicles leave or enter a line of traffic, the vehicle number codes would dynamically adjust appropriately. In preferred embodiments, a vehicle could identify information for an immediately preceding lead vehicle (L), and treat that vehicle as the "front-runner" in a subset of vehicles (S), while also identifying operational information for the vehicle in front of that lead vehicle (L+1) where applicable, and treat that vehicle as the "front-runner" is a second subset of vehicles (S+1), and so on, whereby all data for each subset (S to S+n) could be dynamically evaluated to maintain an optimal separation distance. For example, as long as a vehicle senses the reception of a valid IR data signal including a separation factor value, that vehicle will be considered a "following" vehicle in a "controlled" mode. Once a vehicle loses reception of a valid IR data signal including a separation factor value, that vehicle operates as a new "leading" vehicle and speeds up to the roadway speed limit. Should this action take the vehicle into close proximity behind another DVSS equipped vehicle which is transmitting a valid IR data signal including a separation factor value, the vehicle will revert to a "following" vehicle operational status and the separation factor value will be used to set the separation distance between the vehicle and the new "followed" vehicle.

With the adoption of DVSS, the concept of a single fixed speed limit over a stretch of highway may be replaced by ad-hoc maximum speed limits (within a specified range) determined by groups of vehicles based on the performance characteristics of a "weakest link" (e.g., a vehicle with the worst braking ability). Currently, the maximum speed limit on roadways is based on a speed that has been determined to allow an "average" driver to safely enter, exit, or otherwise maintain safe operation of an "average" vehicle under "average" driving conditions. With DVSS, higher average travel speeds may be achieved to produce higher, yet safe traffic density. Higher traffic density and higher travel speeds will increase the maximum handling capacity of existing roadways, which may forestall or eliminate the need to build additional lanes or otherwise augment infrastructure to handle the increasing number of vehicles utilizing existing roadways.

The foregoing description of embodiments of the present invention has been presented for the purpose of illustration and description. It is not intended to be exhaustive or to limit the invention to the form disclosed. Obvious modifications and variations are possible in light of the above disclosure. The embodiments described were chosen to best illustrate the principles of the invention and practical applications thereof to enable one of ordinary skill in the art to utilize the invention in various embodiments and with various modifications as suited to the particular use contemplated.

What is claimed is:

1. A method of calculating and maintaining a separation distance between a first vehicle and a second vehicle, comprising the steps of:

a second Dynamic Vehicle Separation Controller (DVSC) installed on the second vehicle continually receiving a first separation factor value signal from a first Dynamic Vehicle Separation Controller (DVSC) installed on the first vehicle, which indicates the distance required for the first vehicle to reach a complete stop from a first real-time speed;

the second DVSC calculating a second separation factor value indicating the distance required for the second vehicle to reach a complete stop from a second real-time speed;

the second DVSC transmitting a second separation factor value signal indicating the distance required for the second vehicle to reach a complete stop from the second real-time speed; and the second DVSC continually calculating a separation distance between the first vehicle and the second vehicle based on the first separation factor value and the second separation factor value.

2. The method according to claim 1, further comprising the step of:

the second DVSC receiving a distance signal indicating a real-time distance between the first vehicle and the second vehicle.

3. The method according to claim 2, further comprising the step of:

the second DVSC commanding the second vehicle to increase the real-time distance between the first vehicle and the second vehicle when the real-time distance between the first vehicle and the second vehicle is less than the calculated separation distance.

4. The method according to claim 3, wherein the second DVSC commands the second vehicle to reduce its speed to increase the real-time distance between the first vehicle and the second vehicle.

5. The method according to claim 2, further comprising the step of:

the second DVSC commanding the second vehicle to reduce the real-time distance between the first vehicle and the second vehicle when the real-time distance between the first vehicle and the second vehicle is greater than the calculated separation distance.

6. The method according to claim 5, wherein the second DVSC commands the second vehicle to increase its speed to reduce the real-time distance between the first vehicle and the second vehicle.

7. The method according to claim 1,
wherein the second DVSC comprises:
a processor;
a memory connected to the processor; and
an input/output interface connected to the processor;
wherein the method further comprises the steps of:
storing a braking rating for the second vehicle in the memory, the braking rating indicating the distance required for the second vehicle to reach a complete stop from a specified speed;
the input/output interface receiving a signal corresponding to a real-time speed of the second vehicle; and
the processor calculating the second separation factor value based on the real-time speed of the second vehicle and the braking rating for the second vehicle.

8. The method according to claim 7, further comprising the steps of:

storing in the memory the type of tire installed on the second vehicle and the vehicle mileage when the tires were installed on the second vehicle;
the input/output interface receiving a signal corresponding to a real-time mileage of the second vehicle; and
the processor calculating the second separation factor value also based on the type of tire, the vehicle mileage when the tires were installed on the second vehicle and the real-time mileage of the second vehicle.

9. The method according to claim 7, further comprising the steps of:

the input/output interface receiving a signal corresponding to real-time tire air pressures of the second vehicle; and the processor calculating the second separation factor value also based on the real-time tire air pressures of the second vehicle.

10. The method according to claim 7, further comprising the steps of:

the input/output interface receiving a signal corresponding to a real-time outside air temperature; and
the processor calculating the second separation factor value also based on the real-time outside air temperature.

11. The method according to claim 7, further comprising the steps of:

the input/output interface receiving a signal indicating precipitation; and
the processor calculating the second separation factor value also based on the indication of precipitation.

12. The method according to claim 7, further comprising the steps of:

the input/output interface receiving a signal indicating activation of the second vehicles anti-skid system; and
the processor calculating the second separation factor value also based on the activation of the second vehicle's anti-skid system.

13. The method according to claim 7, further comprising the steps of:

the input/output interface receiving a signal indicating a hazardous road condition; and
the processor calculating the second separation factor value also based on the indication of the hazardous road condition.

14. The method according to claim 1, further comprising the steps of:

the second DVSC receiving a signal indicating an unusual physical condition of a load on the first vehicle or a signal indicating a minimum separation requirement for the first vehicle, which requires an increase to the separation distance between the first vehicle and the second vehicle; and
the first DVSC calculating the separation distance between the first vehicle and the second vehicle also based on the indication of the unusual physical condition of the load on the first vehicle or on the indication of the minimum separation requirement of the first vehicle.

15. A method of calculating and maintaining a separation distance between a first vehicle and a second vehicle, comprising the steps of:

a second Dynamic Vehicle Separation Controller (DVSC) installed on the second vehicle receiving a first separation factor value signal from a first Dynamic Vehicle Separation Controller (DVSC) installed on the first vehicle, which indicates the distance required for the first vehicle to reach a complete stop from a first real-time speed;
the second DVSC calculating a second separation factor value indicating the distance required for the second vehicle to reach a complete stop from a second real-time speed;
the second DVSC transmitting a second separation factor value signal indicating the distance required for the second vehicle to reach a complete stop from the second real-time speed; and
the second DVSC calculating a separation distance between the first vehicle and the second vehicle based on the first separation factor value and the second separation factor value;

wherein the first separation factor value signal is received at an infra-red data receiver connected to the second vehicle.

16. The method according to claim 15, further comprising the step of:
   the second DVSC receiving a distance signal indicating a real-time distance between the first vehicle and the second vehicle.

17. The method according to claim 16, further comprising the step of:
   the second DVSC commanding the second vehicle to increase the real-time distance between the first vehicle and the second vehicle when the real-time distance between the first vehicle and the second vehicle is less than the calculated separation distance.

18. The method according to claim 17, wherein the second DVSC commands the second vehicle to reduce its speed to increase the real-time distance between the first vehicle and the second vehicle.

19. The method according to claim 16, further comprising the step of:
   the second DVSC commanding the second vehicle to reduce the real-time distance between the first vehicle and the second vehicle when the real-time distance between the first vehicle and the second vehicle is greater than the calculated separation distance.

20. The method according to claim 19, wherein the second DVSC commands the second vehicle to increase its speed to reduce the real-time distance between the first vehicle and the second vehicle.

* * * * *